H. E. RUSSELL, Jr.
Spring-Tongs.
No. 223,066. Patented Dec. 30, 1879.
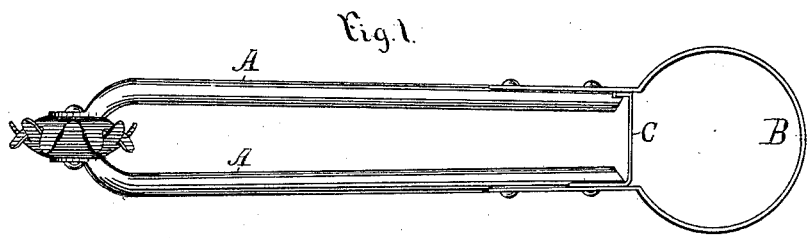
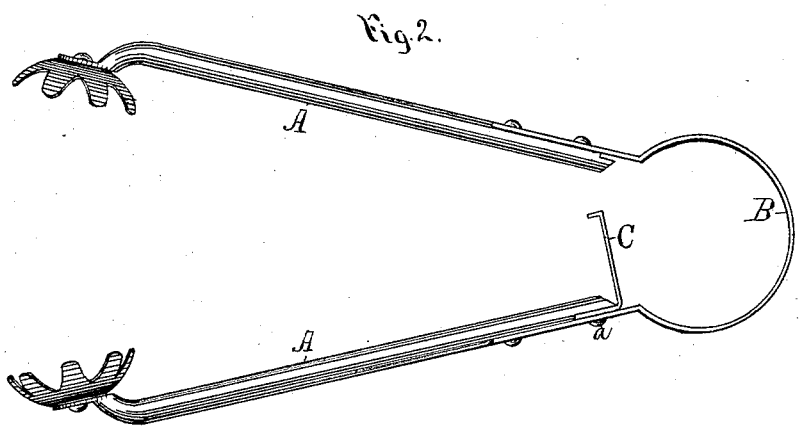

UNITED STATES PATENT OFFICE.

HENRY E. RUSSELL, JR., OF NEW BRITAIN, CONNECTICUT, ASSIGNOR TO RUSSELL & ERWIN MANUFACTURING COMPANY, OF SAME PLACE.

IMPROVEMENT IN SPRING-TONGS.

Specification forming part of Letters Patent No. 223,066, dated December 30, 1879; application filed June 24, 1879.

*To all whom it may concern:*

Be it known that I, HENRY E. RUSSELL, Jr., of New Britain, in the county of Hartford and State of Connecticut, have invented certain new and useful Improvements in Spring-Tongs, of which the following is a specification.

My invention consists in the combination, in tongs, of the arms, spring-bow, and a spring-catch of such length that it will lock the arms only when the spring-bow is compressed slightly more than is sufficient to bring the pads of the arms together, as hereinafter described.

In the accompanying drawings, Figure 1 is a side elevation of spring-tongs which embody my invention, the same being represented with the arms locked together; and Fig. 2 is a side elevation of the same with the arms opened.

A A designate the arms of the tongs, and B the spring which forms the connection of the arms, and acts to force them open when released, all of which may be of any desired or ordinary kind, and made in any proper manner.

The tongs represented in the drawings have one side of the arms flattened for a little distance from their inner ends, to form a seat for the ends of the connecting-spring B, which is secured thereto by rivets. A portion of these flattened sides are still further recessed or flattened, in order to accommodate the spring-catch C, the depth of which recess is equal to the thickness of the metal which forms the catch C, so that one end of said catch may be placed between one arm A and one end of the spring B, and secured by one of the rivets *a*, which secures the arms and spring together.

The opposite end of the catch C has a like bend or hook on its end, but shorter, which hook takes into the recess formed by the deepest recess or flattened portion on the end of the arm. The ends of the arms are beveled off on the inside, as shown, so that the catch is self-locking—that is, the catch will spring into place, as shown in Fig. 1, whenever the arms are closed far enough to bring its hook opposite the open recess.

It is desirable to have the arms closed into a compact position during transportation, or at any time when not in use, while at the same time they should be so arranged as not to fasten themselves accidentally when in use.

I make the catch C so short that after the pads of the tongs are together the inner ends of the arms and spring will have to be slightly compressed before the spring-catch C will snap into place for holding the arms closed, as represented in Fig. 1, whereby there is no probability of any self-fastening only by design.

The spring-catch can easily be pushed back to withdraw its hooked end, when the spring-actuated arms will fly open, ready for use.

The compression of the inner ends of the arms and ends of the spring-bow after the pads meet, in order to allow the spring-catch to snap into place, is accomplished only by springing the bow which carries the arms, and therefore said bow is essential to the self-fastening mechanism as herein arranged, so as not to fasten itself whenever the pads come together.

So far as I know it is new to apply any kind of a catch or clasp to tongs having a spring-bow which carries the arms; consequently it is new to locate any kind of a catch or clasp at the ends of said spring-bow.

By locating the clasp or catch at the junction of the arms and spring-bow, the ends of the spring-bow, as well as the arms, are locked together by the same clasp at the same time, and the extra give, to make the catch engage after the pads come together, resides principally in the same spring which throws the arms open.

I am aware that locking mechanism has been applied to the spring-actuated handles of shears; also, that a prior patent shows a self-fastening spring-catch on spring-actuated handles of pintle-jointed tongs; also, a hinged clasp on the arms of such tongs, all of which prior devices are hereby disclaimed.

I claim as my invention—

In spring-tongs, the combination of the spring-bow B, the arms A A, secured to the ends of said bow, and the spring-catch C, of such length that it will lock the arms only when the spring-bow which carries the arms is compressed slightly more than is necessary to bring the pads on the arms together, substantially as described, and for the purpose specified.

HENRY E. RUSSELL, JR.

Witnesses:
THEO. E. SMITH,
F. G. GUION.